(12) United States Patent
Yoshida (10) Patent No.: US 6,426,797 B1
(45) Date of Patent: Jul. 30, 2002

(54) PRINT DATA OUTPUT CIRCUIT

(75) Inventor: Tatsuya Yoshida, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/389,240

(22) Filed: Sep. 3, 1999

(30) Foreign Application Priority Data

Sep. 4, 1998 (JP) ............................................. 10-251622

(51) Int. Cl.[7] .............................................. G06K 15/00
(52) U.S. Cl. ...................................... 358/1.11; 358/1.1
(58) Field of Search ................................. 358/1.1, 1.11, 358/1.16, 1.17, 539, 470; 345/530, 534, 537, 538, 564, 565; 382/184, 185; 710/1, 9, 13, 22, 25, 26, 27

(56) References Cited

U.S. PATENT DOCUMENTS 5,426,727 A 6/1995 Sugiura et al. ................ 382/46
6,184,999 B1 * 2/2001 Yoshida et al. ............ 358/1.16
6,304,335 B1 * 10/2001 Furuya et al. ............. 358/1.15

* cited by examiner

Primary Examiner—Arthur G. Evans
(74) Attorney, Agent, or Firm—Greenblum & Bernstein, P.L.C.

(57) ABSTRACT

A print data output circuit for outputting bitmap data for printing based on character codes is provided with: a data memory for storing character codes to be printed; a bitmap data memory for storing bitmap data corresponding to the character codes stored in the data memory; a clock generator that generates a predetermined clock signal; a counter unit that generates first address data of the data memory, a character code stored at the first address of the data memory being read out of the data memory, second address data of the bitmap data memory being generated in accordance with the clock signal and the character codes corresponding to the first address data, bit map data stored at the second address of the bitmap memory being output therefrom; and a parallel-to-serial converter that converts bitmap data stored in the bitmap data memory and corresponding to the second address data to serial data for printing.

4 Claims, 8 Drawing Sheets

FIG. 1

MEM1

|  | N1 | N2 | COLUMN → |
|---|---|---|---|
| M1 | @ "40H" | A "41H" |  |
| M2 | B "42H" | C "43H" |  |

ROW ↓

| CHARACTER CODE [0 × 40] | BIT ROW | [00] 01234567 | [01] 01234567 | [02] 01234567 | [03] 012345 | ROM# DOT# |
|---|---|---|---|---|---|---|
| | 00 | 00000000 | 00000000 | 00000000 | 000000 | |
| | 01 | 00000000 | 00000000 | 00000000 | 000000 | |
| | 02 | 00000000 | 00000000 | 00000000 | 000000 | |
| | 03 | 00000000 | 00000000 | 00000000 | 000000 | |
| | 04 | 00000000 | 00000000 | 00000000 | 000000 | |
| | 05 | 00000000 | 00000000 | 00000000 | 000000 | |
| | 06 | 00000000 | 00000000 | 00000000 | 000000 | |
| | 07 | 00000000 | 00000000 | 00000000 | 000000 | |
| | 08 | 00000000 | 00000000 | 00000000 | 000000 | |
| | 09 | 00000000 | 00000000 | 00000000 | 000000 | |
| | 0A | 00000000 | 00000000 | 00000000 | 000000 | |
| | 0B | 00000000 | 00000000 | 00000000 | 000000 | |
| | 0C | 00000000 | 00011111 | 11110000 | 000000 | |
| | 0D | 00000000 | 01111111 | 11111100 | 000000 | |
| | 0E | 00000001 | 11110000 | 00011111 | 000000 | |
| | 0F | 00000011 | 11000000 | 00000111 | 100000 | |
| | 10 | 00000111 | 00000000 | 00000001 | 110000 | |
| | 11 | 00001110 | 00000000 | 00000000 | 110000 | |
| | 12 | 00001100 | 00000000 | 00000000 | 111000 | |
| | 13 | 00011100 | 00001111 | 11001100 | 011000 | |
| | 14 | 00011000 | 00011111 | 11101100 | 011100 | |
| | 15 | 00011000 | 00111000 | 01111100 | 001100 | |
| | 16 | 00111000 | 00110000 | 00111000 | 001100 | |
| | 17 | 00110000 | 01110000 | 00111000 | 001100 | |
| | 18 | 00110000 | 01100000 | 00111000 | 001100 | |
| | 19 | 00110000 | 01100000 | 00110000 | 001100 | |
| | 1A | 00110000 | 11000000 | 01110000 | 001100 | |
| | 1B | 00110000 | 11000000 | 01110000 | 001100 | |
| | 1C | 00110000 | 11000000 | 01100000 | 011100 | |
| | 1D | 00110000 | 11000000 | 01100000 | 011000 | |
| | 1E | 00111000 | 11000000 | 11110000 | 111000 | |
| | 1F | 00011000 | 11100011 | 10110000 | 110000 | |
| | 20 | 00011000 | 01111111 | 10111111 | 100000 | |
| | 21 | 00011100 | 00111110 | 00011111 | 000000 | |
| | 22 | 00001100 | 00000000 | 00000000 | 000000 | |
| | 23 | 00001110 | 00000000 | 00000000 | 110000 | |
| | 24 | 00000111 | 10000000 | 00000011 | 110000 | |
| | 25 | 00000011 | 11100000 | 00011111 | 100000 | |
| | 26 | 00000000 | 11111111 | 11111110 | 000000 | |
| | 27 | 00000000 | 00111111 | 11110000 | 000000 | |
| | 28 | 00000000 | 00000000 | 00000000 | 000000 | |
| | 29 | 00000000 | 00000000 | 00000000 | 000000 | |
| | 2A | 00000000 | 00000000 | 00000000 | 000000 | |
| | 2B | 00000000 | 00000000 | 00000000 | 000000 | |
| | 2C | 00000000 | 00000000 | 00000000 | 000000 | |
| | 2D | 00000000 | 00000000 | 00000000 | 000000 | |
| | 2E | 00000000 | 00000000 | 00000000 | 000000 | |
| | 2F | 00000000 | 00000000 | 00000000 | 000000 | |
| | 30 | 00000000 | 00000000 | 00000000 | 000000 | |
| | 31 | 00000000 | 00000000 | 00000000 | 000000 | |
| | | BK1 | BK2 | BK3 | BK4 | |

FIG. 5    @ ("4OH")

| ADDRESS | DATA | ADDRESS | DATA | ADDRESS | DATA | ADDRESS | DATA |
|---|---|---|---|---|---|---|---|
| 1000 | 00 | 5000 | 00 | 9000 | 00 | D000 | 00 |
| 1001 | 00 | 5001 | 00 | 9001 | 00 | D001 | 00 |
| 1002 | 00 | 5002 | 00 | 9002 | 00 | D002 | 00 |
| 1003 | 00 | 5003 | 00 | 9003 | 00 | D003 | 00 |
| 1004 | 00 | 5004 | 00 | 9004 | 00 | D004 | 00 |
| 1005 | 00 | 5005 | 00 | 9005 | 00 | D005 | 00 |
| 1006 | 00 | 5006 | 00 | 9006 | 00 | D006 | 00 |
| 1007 | 00 | 5007 | 00 | 9007 | 00 | D007 | 00 |
| 1008 | 00 | 5008 | 00 | 9008 | 00 | D008 | 00 |
| 1009 | 00 | 5009 | 00 | 9009 | 00 | D009 | 00 |
| 100A | 00 | 500A | 00 | 900A | 00 | D00A | 00 |
| 100B | 00 | 500B | 00 | 900B | 00 | D00B | 00 |
| 100C | 00 | 500C | 1F | 900C | F0 | D00C | 00 |
| 100D | 00 | 500D | 7F | 900D | FC | D00D | 00 |
| 100E | 01 | 500E | F0 | 900E | 1F | D00E | 00 |
| 100F | 03 | 500F | C0 | 900F | 07 | D00F | 80 |
| 1010 | 07 | 5010 | 00 | 9010 | 01 | D010 | C0 |
| 1011 | 0E | 5011 | 00 | 9011 | 00 | D011 | C0 |
| 1012 | 0C | 5012 | 00 | 9012 | 00 | D012 | E0 |
| 1013 | 1C | 5013 | 0F | 9013 | CC | D013 | 60 |
| 1014 | 18 | 5014 | 1F | 9014 | EC | D014 | 70 |
| 1015 | 18 | 5015 | 38 | 9015 | 7C | D015 | 30 |
| 1016 | 38 | 5016 | 30 | 9016 | 38 | D016 | 30 |
| 1017 | 30 | 5017 | 70 | 9017 | 38 | D017 | 30 |
| 1018 | 30 | 5018 | 60 | 9018 | 38 | D018 | 30 |
| 1019 | 30 | 5019 | 60 | 9019 | 30 | D019 | 30 |
| 101A | 30 | 501A | E0 | 901A | 30 | D01A | 30 |
| 101B | 30 | 501B | C0 | 901B | 70 | D01B | 30 |
| 101C | 30 | 501C | C0 | 901C | 60 | D01C | 70 |
| 101D | 30 | 501D | C0 | 901D | 60 | D01D | 60 |
| 101E | 38 | 501E | C0 | 901E | FD | D01E | E0 |
| 101F | 18 | 501F | E3 | 901F | B1 | D01F | C0 |
| 1020 | 18 | 5020 | 7F | 9020 | BF | D020 | 80 |
| 1021 | 1C | 5021 | 3E | 9021 | 1F | D021 | 00 |
| 1022 | 0C | 5022 | 00 | 9022 | 00 | D022 | 00 |
| 1023 | 0E | 5023 | 00 | 9023 | 00 | D023 | C0 |
| 1024 | 07 | 5024 | 80 | 9024 | 03 | D024 | C0 |
| 1025 | 03 | 5025 | E0 | 9025 | 1F | D025 | 80 |
| 1026 | 00 | 5026 | FF | 9026 | FE | D026 | 00 |
| 1027 | 00 | 5027 | 3F | 9027 | FD | D027 | 00 |
| 1028 | 00 | 5028 | 00 | 9028 | 00 | D028 | 00 |
| 1029 | 00 | 5029 | 00 | 9029 | 00 | D029 | 00 |
| 102A | 00 | 502A | 00 | 902A | 00 | D02A | 00 |
| 102B | 00 | 502B | 00 | 902B | 00 | D02B | 00 |
| 102C | 00 | 502C | 00 | 902C | 00 | D02C | 00 |
| 102D | 00 | 502D | 00 | 902D | 00 | D02D | 00 |
| 102E | 00 | 502E | 00 | 902E | 00 | D02E | 00 |
| 102F | 00 | 502F | 00 | 902F | 00 | D02F | 00 |
| 1030 | 00 | 5030 | 00 | 9030 | 00 | D030 | 00 |
| 1031 | 00 | 5031 | 00 | 9031 | 00 | D031 | 00 |

PRINT DATA OUTPUT CIRCUIT

BACKGROUND OF THE INVENTION

The present invention relates to a print data output circuit for outputting bitmap data to a printer.

Conventionally, in a line printer or a page printer, in order to print data including alphanumerical character pattern data, a print data output circuit is employed for developing bitmap data in accordance with the character code data generated by, for example, a computer. In a laser beam printer, for example, an optical scanning system is driven in accordance with the bitmap data so that the scanning laser beam is ON/OFF modulated to form a latent image on a photoconductive surface.

Specifically, in such a print data output circuit, when character code data is received from a computer or the like, the print data output circuit reads out bitmap data corresponding to the received character code data, and develop the bitmapped image in a page memory.

After the bitmapped image for one page is developed in the page memory, the data (i.e., the bitmap data) of the bitmapped image is read line by line, and then transmitted as serial data to a printer. The printer receives the serial data, and modulates a scanning laser beam in accordance with the serial data to form an image corresponding to the bitmap data.

As described above, in the conventional print data output circuit, in order to store the bitmap data corresponding to one page, at least one page memory is required. If the number of characters to be printed on a page is relatively great, or if the number of bits for each character is great, the page memory is also required to have a large capacity. Therefore, the print data output circuit tends to be large in size, and expensive. Further, in the conventional print data output circuit, before printing operation is executed, the bitmapped image for an entire page is developed. Therefore, it takes time from input of print data (character codes) to start of the printing operation.

The above-described problem also arises when a printer is tested using predetermined test data. That is, even when a predetermined character string is to be printed repeatedly, bitmapped data corresponding to one page should be developed on the page memory. Therefore, a testing device is also required to have a page memory having a large capacity, and the testing device also tends to) be large in size, and the test takes a relatively long period.

SUMMARY OF THE INVENTION

It is therefore an object of the invention to provide an improved print data output circuit which enables printing character images without using a page memory.

For the above object, according to the present invention, there is provided a print data output circuit for outputting bitmap data for printing based on character codes, provided with:

a data memory for storing character codes to be printed;

a bitmap data memory for storing bitmap data corresponding to the character codes stored in the data memory;

a clock generator that generates a predetermined clock signal;

a counter unit that generates first address data of the data memory, a character code stored at the first address of the data memory being read out of the data memory, second address data of the bitmap data memory being generated in accordance with the clock signal and the character codes corresponding to the first address data, bit map data stored at the second address of the bitmap memory being output therefrom; and a parallel-to-serial converter that converts bitmap data stored in the bitmap data memory and corresponding to the second address data to serial data for printing.

Optionally, the bitmap data corresponding to each of the character codes may include a plurality of dot rows, each of the plurality of dot rows including a plurality of dot columns, and the plurality of dot columns may be divided into a predetermined number of groups, each of the plurality of groups defining a block having the plurality of dot rows.

In particular case, the counter unit may include:

a D counter for counting the number of the groups for each character;

an N counter for counting the total number of groups in a row;

an L counter for counting the number of the bit rows of each character;

an M counter for counting the total number of rows of the characters, wherein the first address of the data memory is generated in accordance with the counts of the N counter and M counter, and wherein the second address of the bitmap memory is generated in accordance with the counts of the N counter and L counter, and a character code read out of the data memory.

According to another aspect of the invention, there is provided a method of printing characters arranged in a matrix of a plurality of character rows by a plurality of character columns, each character has a bitmap consisting of a matrix of a plurality of dots by a plurality of bit rows, the method includes:

sequentially designating the rows of the character matrix and executing the following step for each designated character row;

sequentially designating the bit rows of a bitmap and executing the following step for each designated bit row; and sequentially designating the columns of the character matrix and executing (a)–(c) for each designated character column:

(a) designating a bitmap corresponding to a character at currently designated row and column;

(b) obtaining bitmap data for currently designated bit row; and (c) outputting the obtained bitmap data to the printer.

BRIEF DESCRIPTION OF THE ACCOMPANYING DRAWINGS

FIG. 4 shows bitmap data of a character "@";

FIG. 5 is a table showing addresses of bitmap data for the character "@";

DESCRIPTION OF THE EMBODIMENT

The present invention will be described with reference to accompanying drawings.

Figure 1:
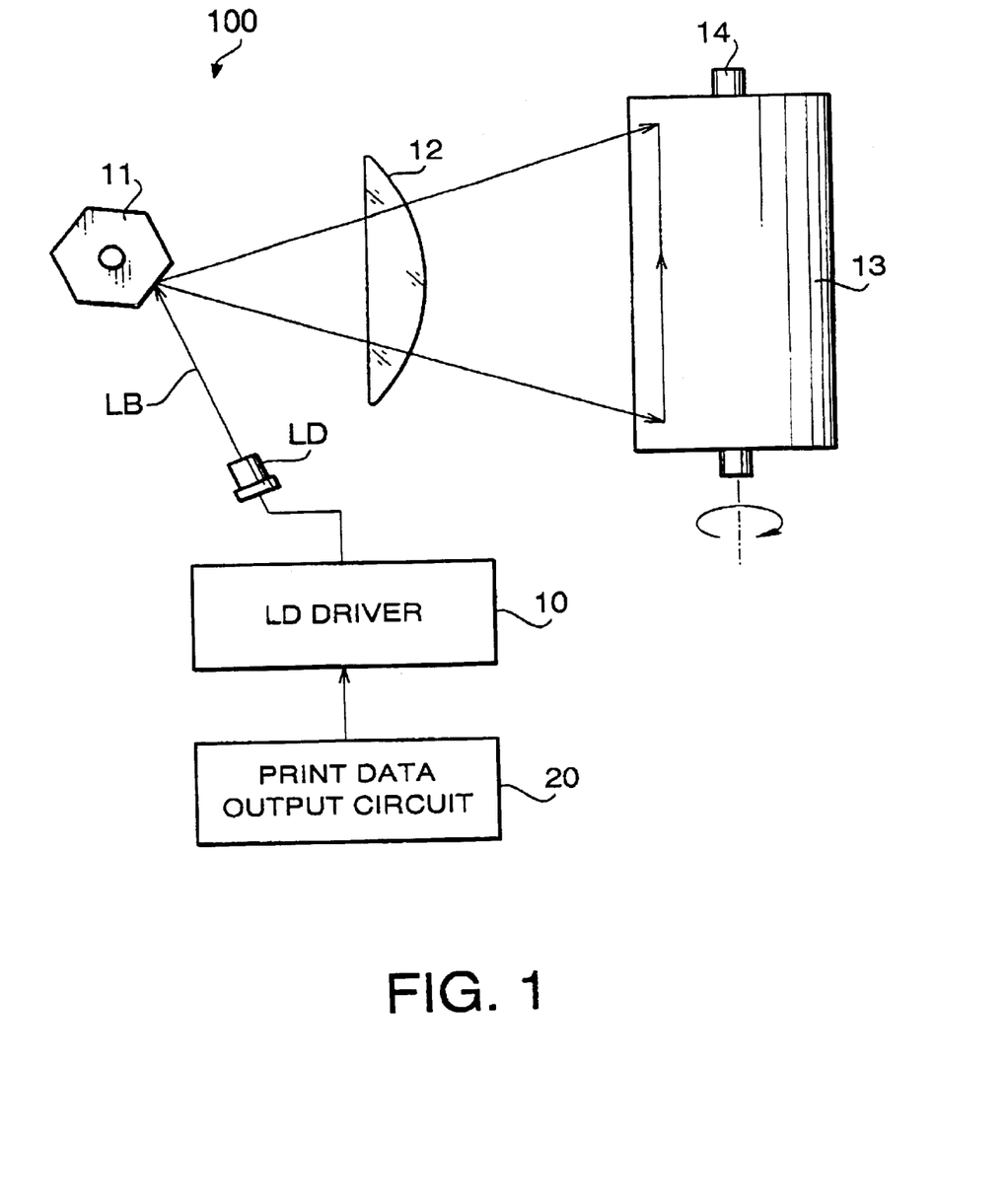
FIG. 1 schematically shows a configuration of a printer according to an embodiment of the invention.

FIG. 1 schematically shows a configuration of a laser beam printer 100 according to an embodiment of the invention.

The laser beam printer 100 is provided with a laser diode which is controlled by an LD (Laser Diode) driver 10 to emit a laser beam LB. The laser beam LB is modulated by the LD driver 10 in accordance with print data which is transmitted from a print data output circuit 20. The laser beam LB is deflected by a polygon mirror 11, which rotates at a predetermined speed, to scan on a surface of a photoconductive drum 13 at a constant speed via an fθ lens 12. Synchronously with scanning of the laser beam LB on the surface of the photoconductive drum 13, the photoconductive drum 13 is rotated about a rotational axis 14. Thus, a two-dimensional image is formed on the surface of the photoconductive drum 13. The print data output circuit 20 outputs serial data carrying bitmap data corresponding to the print data, i.e., character code data.

Figure 2:
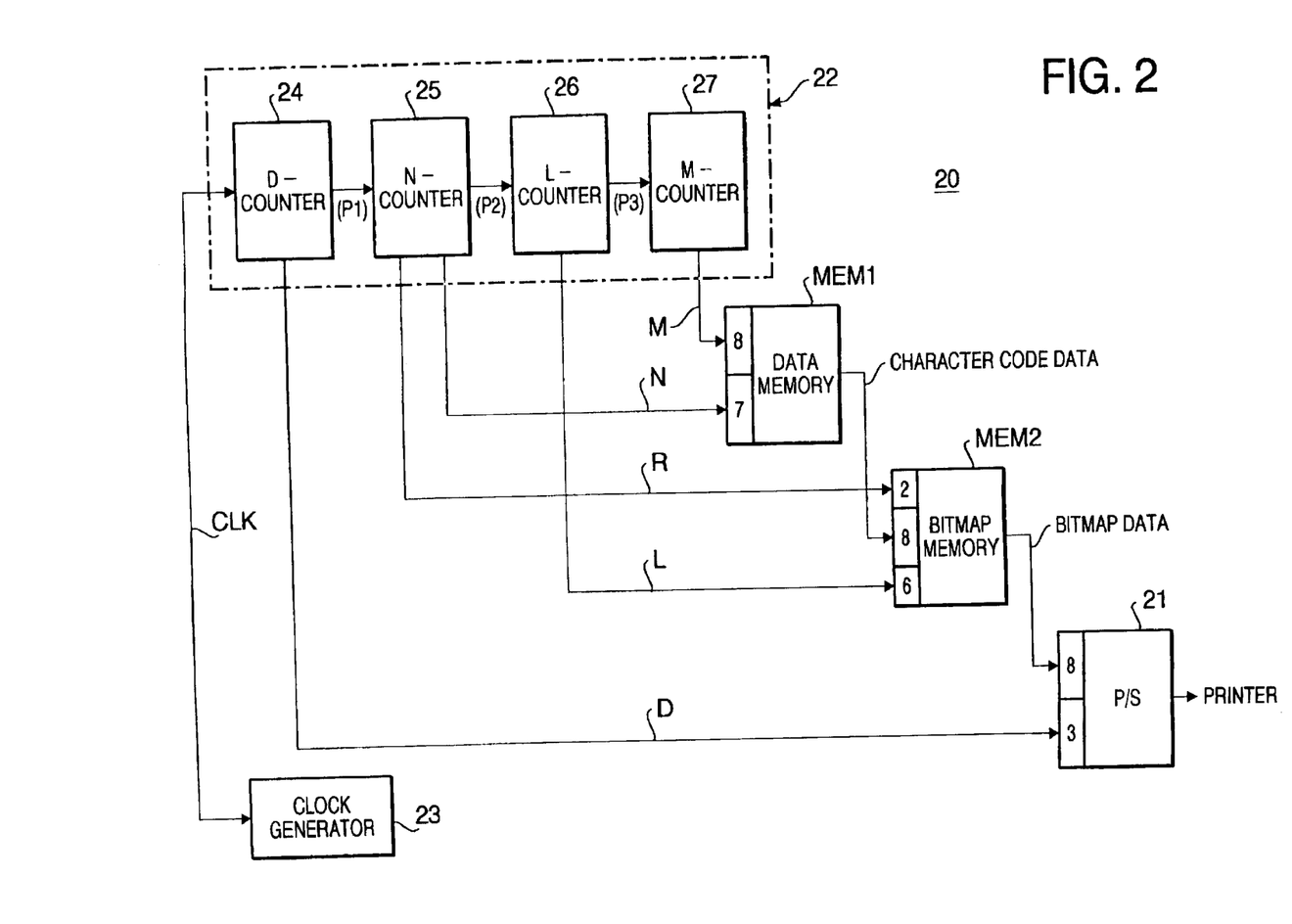
FIG. 2 is a block diagram of a print data output circuit employed in the printer shown in FIG. 1.

FIG. 2 is a block diagram of the print data output circuit 20 employed in the printer shown in FIG. 1.

The print data output circuit 20 is provided with:

a data memory MEM1 for storing character codes;

a bitmap memory MEM2 for storing bitmap data corresponding to the character codes;

a P/S (parallel-to-serial) converter 21 for reading out the bitmap data, generating a serial data based on the read-out bitmap data, and outputting the serial data to the printer 100;

a counter unit 22 outputting signals for controlling reading out of the data stored in the data memory MEM1, the bitmap memory MEM2, and operation of the P/S converter 21; and a clock generator 23 for outputting a clock signal CLK having a predetermined clock frequency.

It should be noted that the clock generator 23 can be a well-known clock generating circuit using a quartz oscillator. The counter unit 22 includes four 8-bit binary counters: D-counter 24; N-counter 25; L-counter 26; and M-counter 27.

In the data memory MEM1, character codes representing a character pattern to be printed are stored. Specifically, when characters are to be printed as an n×k matrix, character codes corresponding to the characters are stored at addresses corresponding to positions in the n×k matrix.

Figure 3:
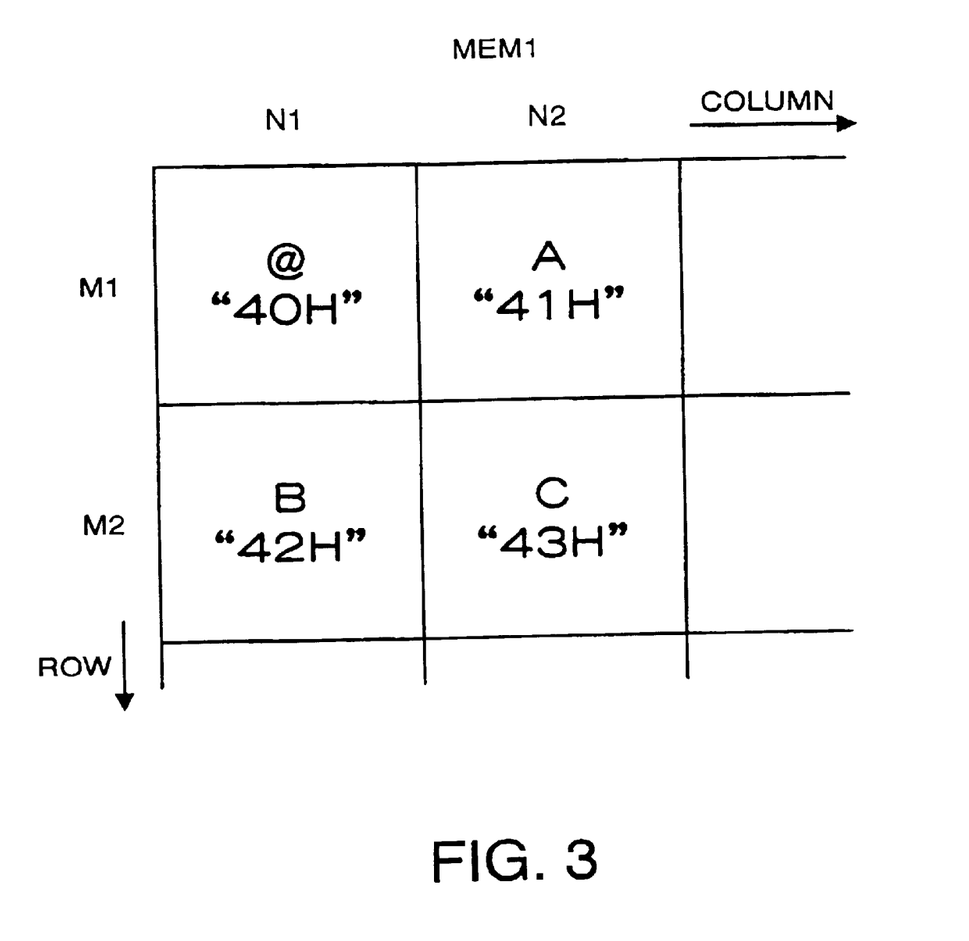
FIG. 3 is a diagrammatic sketch of a data memory storing character codes.

FIG. 3 is a diagrammatic sketch of the data memory MEM1 storing character codes. In this example, four characters, "@", "A", "B" and "C" to be printed in 2×2 matrix (i.e., n=2 and k=2) are shown. In the data memory MEM1, character codes (8-bit character codes), i.e., "40H (H: hexadecimal)", "41H", "42H" and "43H" are stored at addresses corresponding to the 2×2 matrix. For addressing, a 16-bit signal is used: lower 7 bits (i.e., from bit 0 to bit 6) represents a row number n (n is an integer); and next 8 bits (i.e., from bit 7 to bit 14) represents a column number k (k is an integer).

In the bitmap memory MEM2, bitmap data representing dot patterns respectively corresponding to character codes stored in the data memory MEM1 is stored.

FIG. 4 shows an example of bitmap data of a character "@", stored in the bitmap memory MEM2. Bitmap data for the character "@" consists of 50 bit rows×30 bit columns. The 30 bits of data in each row is divided into four groups "ROM00", "ROM01", "ROM02" and "ROM03" respectively includes 8 bits, 8 bits, 8 bits and 6 bits of bit data. Dot numbers 0–7 are assigned to the 8 bits of each of the groups "ROM00", "ROM01" and "ROM02", and dot numbers 0–5 are assigned to the 6 bits of the group "ROM03" as shown in FIG. 4. A block is defined to contain all the bitmap data categorized in each group, and thus four blocks BK1, BK2, BK3 and BK4 are defined for each character. Each block is stored in the bitmap memory MEM2 within a predetermined address block.

Figure 6:
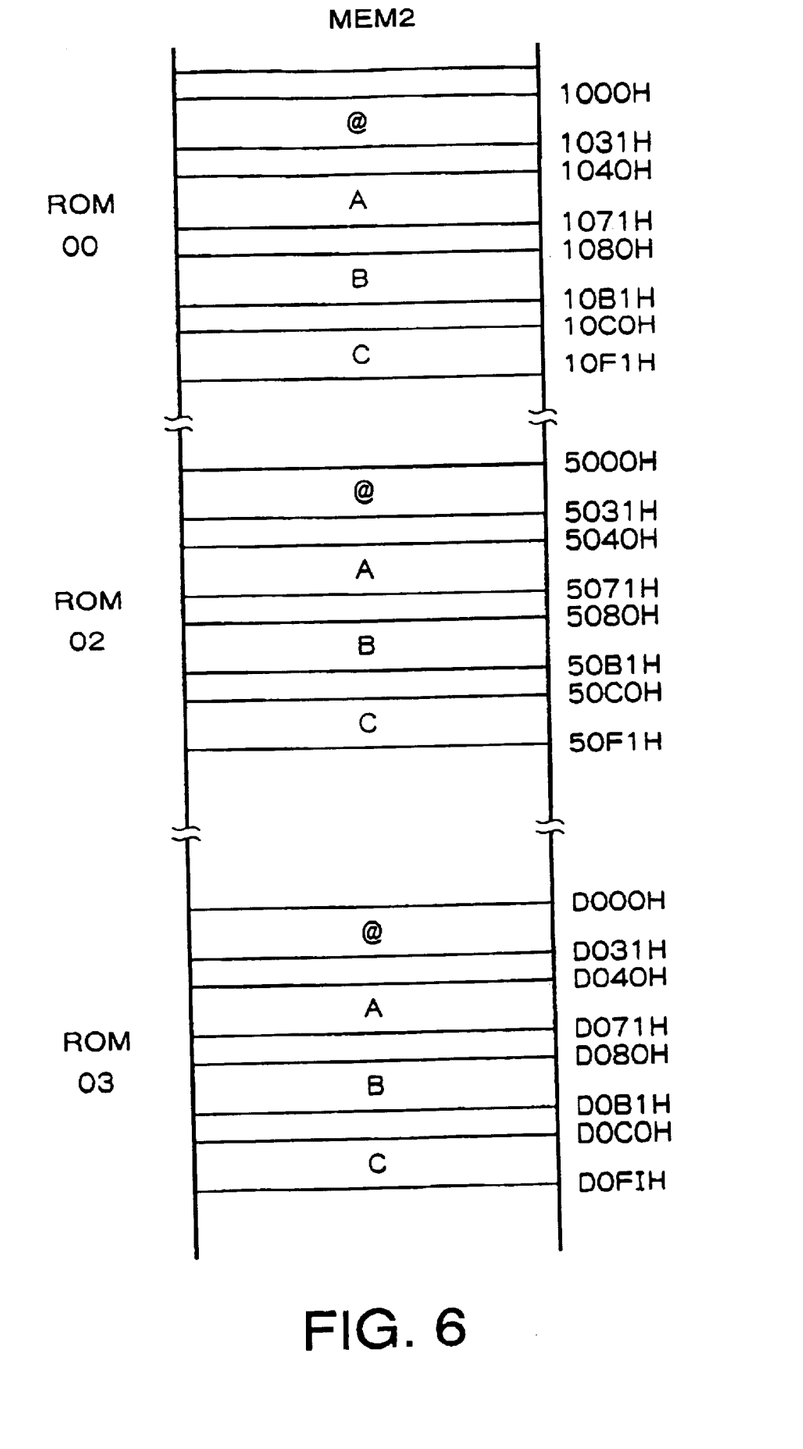
FIG. 6 is an address map of a bitmap memory.

FIG. 5 is a table showing addresses of bitmap data for the character "@", and FIG. 6 is an address map of the bitmap memory MEM2.

In Fig. 5, the columns of the table corresponds to the four blocks BK1, BK2, BK3 and BK4, respectively. The data of block BK1 is stored in addresses 1000H–1031H; the data of block BK2 is stored in addresses 5000H–5031H; the data of block BK3 is stored in addresses 9000H–9031H; and the data of block BK4 is stored in addresses D000H–D031H.

The P/S converter 21 converts the 8-bit parallel data read out of the bitmap memory MEM2 into serial bit data in the order of dot number within each group. The serial bit data is used for printing.

To the counter unit 22, the clock signal CLK generated by the clock generator 23 is input. The D-counter 24 receives the clock signal CLK, counts the clock pulses and outputs an 8-bit count data. Further, the D-counter 24 outputs a pulse signal P1 indicating periodic counting of 8 pulses, 8 pulses, 8 pulses and 6 pulses of the clock pulses in this order. Thus, the pulse signal P1 indicates each of the groups shown in FIG. 4. Furthermore, the counter unit 22 transmits lower 3 bits of the 8-bit count data output to the P/S converter 21 as a D-data. It should be noted that the count of the clock signal CLK by the D-counter 24 is reset every time when the pulse signal P1 is output. Accordingly, data values of D-data changes from "000B" (B: binary) to "111B" when 8 pulses are counted, and changes "000B" to "110B" when 6 pulses are counted.

The N-counter 25 receives the pulse signal P1 output by the D-counter 24, counts the same, and outputs 9-bit count data. Further, the N-counter 25 outputs a pulse signal P2 at every counting of 4×k pulses of the pulse signal P1. Thus, the pulse signal P2 is output at a period which is a multiplication of the number of groups for one character and the number of characters in one row (i.e., k). In other words, the pulse signal P2 is output when the number of the pulse signal P1 reaches the number of the characters in a row. Within the 9-bit count data output by the N-counter 25, the upper 7 bits are transmitted as N-data to the data memory MEM1, and the lower 2 bits to the bitmap memory MEM2 as R-data. Thus, the N-data represents the number k (i.e., the column number in the data memory MEM1), and the R-data represents a block number of the four groups "ROM00"–"ROM03".

It should be noted that the N-counter 25 outputs a pulse signal P2 at every counting of 4×k pulses since the number of groups is four, and if the number of groups is S (S: integer), then the N-counter 25 outputs a pulse signal P2 at every counting of S×k pulses. Further, in the embodiment, the R-data is 2-bit data since the number of the groups is four, and the number of bits of the R-data as well as the constitution of the N-counter 25 should be changed in accordance with the number of the groups of actual application. Furthermore, the N-data is not limited to be 7-bit data. The number of bits of the N-data can be changed to any suitable value if a character number in one ROW can be designated by the N-data.

The L-counter 26 receives the pulse signal P2, counts the pulse signal P2, and when the number of bit rows for each character is counted, outputs a pulse signal P3. In this embodiment, since each character is configured to have 50 bit rows as shown in FIG. 4, the pulse signal P3 is output every time when 50 pulses of the pulse signal P2 are counted. Further, 6-bit count data output by the L-counter 26 is transmitted as L-data to the bitmap memory MEM2. Thus, the L-data represents a bit row number in a bitmap data of each block. It should be noted that the count of the pulse signal P2 is reset every time when the pulse signal P3 is output. It should be noted that, in the embodiment, since the number of bit rows is 50, the L-data is required to have 6 bits in order to designate each of the 50 bit rows. The number of bits of the L-data should be varied in accordance with the number of bit rows of the bitmap data for one character. For example, if the number of the bit rows is 70, 7-bit data is necessary to designate each of the bit rows.

The M-counter 27 receives the pulse signal P3, and counts the pulse signal P3. The M-counter 27 is reset every time when the number of the bit rows to be printed for each character is counted. The 8-bit count data is transmitted as M-data to the data memory MEM1. It should be noted that the M-data represents the row number n of the rows Mn in the data memory MEM1.

Figure 7A:
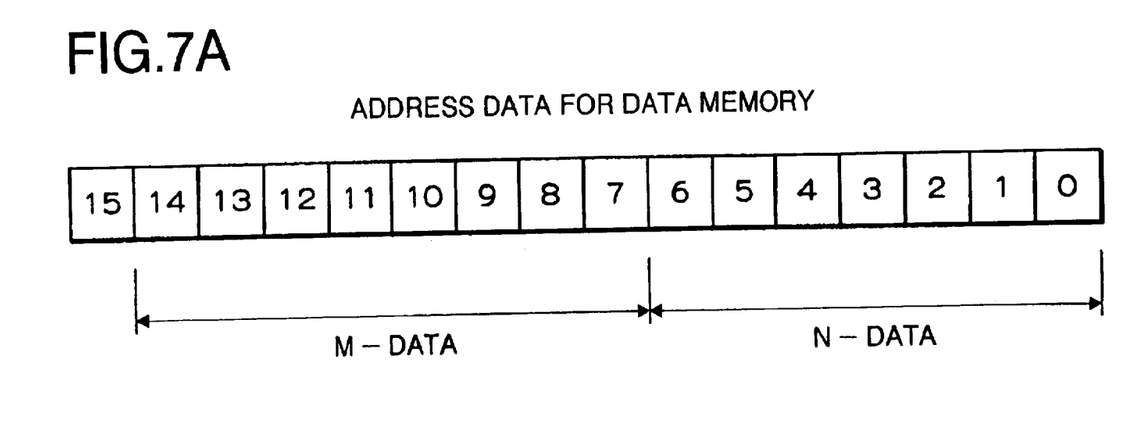
FIG. 7A shows a constitution of an address signal of the data memory.

Then, as shown in FIG. 7A, the counter unit 22 generates a data memory address signal by combining the M-data and the N-data. By M-data, a row number n of Mn in FIG. 3 is designated, and by the N-data, a column number k of Nk in FIG. 3 is designated.

The data memory address signal is transmitted to the data memory MEM1 to access the corresponding character and to read out the 8-bit character code data.

Figure 7B:
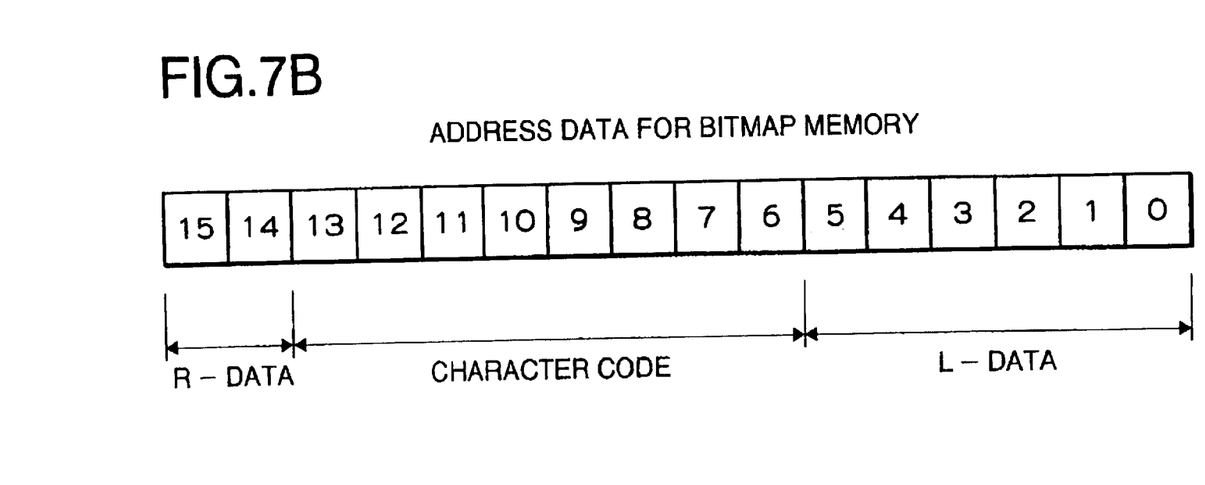
FIG. 7B shows a constitution of an address signal of the bitmap memory.

As shown in FIG. 7B, the read out 8-bit character code data is combined with the L-data and R-data, and a 16-bit bitmap data address is generated. In this case, the L-data constitutes the lower 6 bits of the address signal, the R-data constitutes the upper 2 bits thereof, and the 8-bit character code data is located therebetween. Thus, generated 8-bit data is transmitted to the bitmap memory MEM2, and the corresponding bitmap data for the character is read out as 8-bit bitmap data.

In other words, by the character code data, one of the bitmap patterns corresponding to the character identified by Mn and Nk is designated, by the R-data, one of the blocks BK1–BK4 for the selected bitmap pattern is designated, and by the L-data, a bit row data within the designated block. Then, the 8-bit data of the designated row within the designated block is transmitted to the P/S converter 21 as 8-bit data.

As shown in FIG. 2, the 8-bitmap data is placed at the upper 8 bits, and the D-data is placed as the lower 3 bits, and the signal is transmitted to the P/S converter 21. By the P/S converter 21, the 8-bit bitmap data is converted into a serial data signal. The serial data signal is transmitted to the printer 100.

Operation of the print data output circuit will be described. In order to simplify the description, the operation will be described with reference to a case where four characters "@", "A", "B" and "C" in a 2×2 matrix as shown in FIG. 3 are to be printed.

Figure 8:
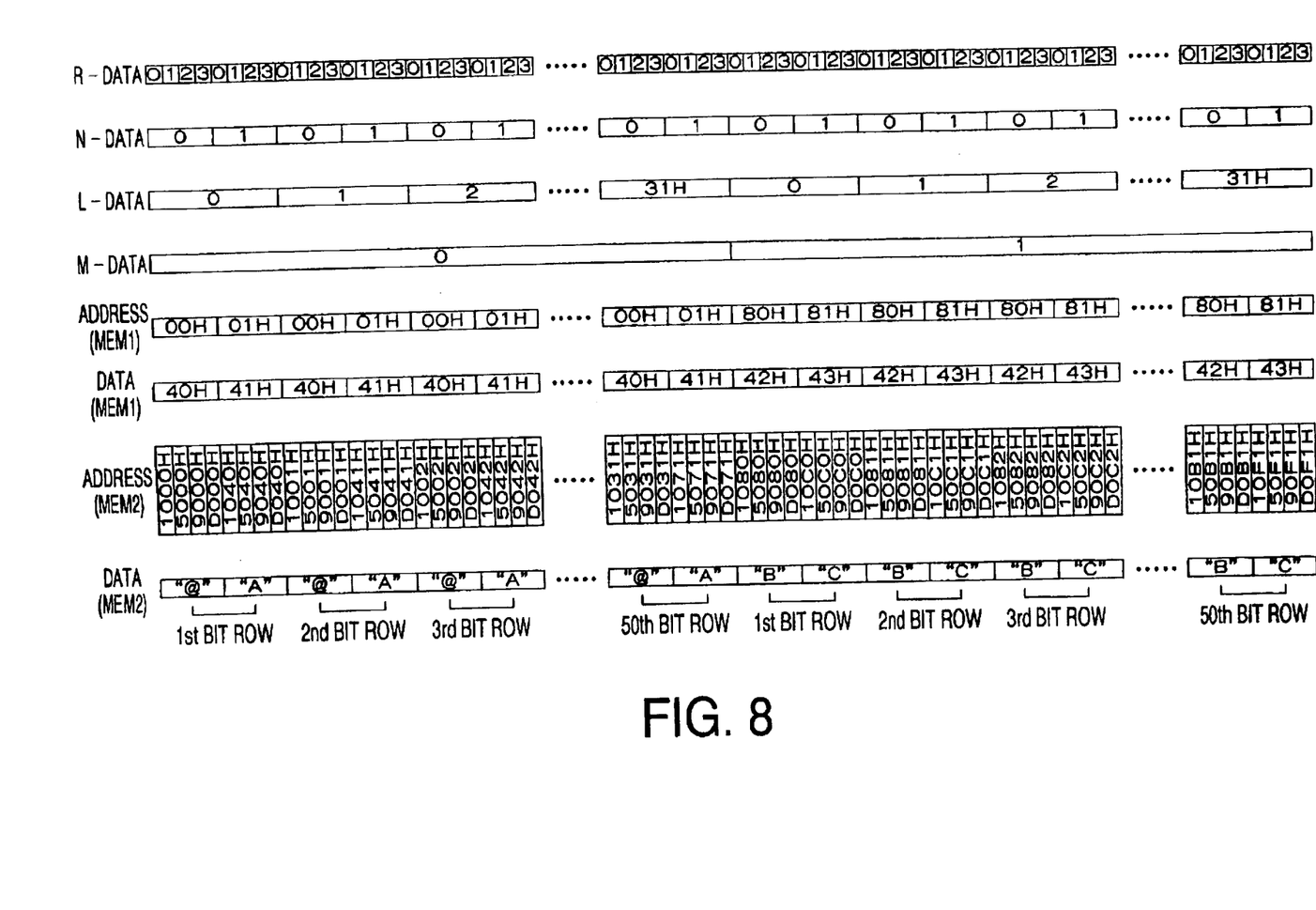
FIG. 8 is a chart showing operational timing of counters and memories of the print data output circuit.

FIG. 8, which will be referred to in the description, is a chart showing operational timing of counters and memories of the print data output circuit 20. In order to indicate a position in the data memory MEM1, indication (Mn, Nk) is used: that is, (Mn, Nk) means a position at n-th row and k-th column.

In this example, in the data memory MEM1, character codes of "@" and "A", i.e., "40H" and "41H" are stored in (M1, N1) and (M1, N2). Similarly, character codes of "B" and "C", i.e., "42H" and "43H" are stored in (M2, N1) and (M2, N2).

The character positions (i.e., rows and columns in FIG. 3) are sequentially designated by the data address (i.e., by Mn and Nk). Then, a character code data corresponding to the designated character position is output as the character code data.

The character code data is combined with the R-data representing the group number and the L-data representing the bit rows in a group, and the address data for the bitmap memory MEM2 is generated. As shown in FIG. 6, in the bitmap memory MEM2, at 1000H–1031H, the data of the first group (ROM00) of the character "@" is stored. Similarly, at 5000H–5031H, the data of the second group (ROM01) of the character, "@" is stored, at 9000H–9031H, the data of the third group (ROM02) of the character "@" is stored, and at D000H–D031H, the data of the fourth group (ROM03) of the character "@" is stored.

As described above, and as shown in FIG. 8, the R-data designate a group (i.e., one of ROM00–ROM03), the N-data designates the number k of Nk (i.e., the character number in a row in FIG. 3), the L-data designates the bit row, and the M-data designates the number n of Mn (i.e., the character number in a column in FIG. 3).

Thus, in this example, the characters in row M1 are sequentially and repeatedly designated, and bit lines for each character are printed. When all the bit lines for each characters in row M1 are printed, the characters in row M2 are sequentially and repeatedly designated, and bit lines therefor are printed similarly. Thus, the address of the data memory MEM1 is changed synchronously of the N-data, and the 8-bit data (character code data) corresponding to the M-data and the N-data is output from the data memory MEM1. By combining the 8-bit data output by the data memory MEM1, R-data and L-data, 8-bit dot data for one bit row is designated (the address of the bitmap data memory MEM2 is generated), and the 8-bit dot data is output from the bitmap data memory MEM2.

According to the present invention, when a plurality of characters arranged in a matrix of a plurality of character rows by a plurality of character columns are printed, and each character has a bitmap consisting of a matrix of a plurality of dots by a plurality of bit rows, the following procedure is executed.

1. The rows of the character matrix are sequentially designated, and, for each designated character row the following procedure is executed.

That is, the bit rows of a bitmap are sequentially designated, and, for each designated bit row, the columns of the character matrix are sequentially designated, and (a)–(c) below are executed for each designated character column:

(a) designating a bitmap corresponding to a character at currently designated row and column;

(b) obtaining bitmap data for currently designated bit row; and (c) outputting the obtained bitmap data to the printer.

The present disclosure relates to the subject matter contained in Japanese Patent Application No. HEI 10-251622, filed on Sep. 4, 1998, which is expressly incorporated herein by reference in its entirety.

What is claimed is:

1. A print data output circuit for outputting bitmap data for printing based on character codes, comprising:

a data memory for storing character codes to be printed;

a bitmap data memory for storing bitmap data corresponding to said character codes stored in said data memory;

a clock generator that generates a predetermined clock signal;

a counter unit that generates first address data of said data memory, a character code stored at said first address of said data memory being read out of said data memory, second address data of said bitmap data memory being generated in accordance with the clock signal and the character codes corresponding to said first address data, bit map data stored at said second address of said bitmap memory being output therefrom; and a parallel-to-serial converter that converts bitmap data stored in said bitmap data memory and corresponding to said second address data to serial data for printing.

2. The print data output circuit according to claim 1, wherein the bitmap data corresponding to each of the character codes includes a plurality of dot rows, each of said plurality of dot rows including a plurality of dot columns, wherein said plurality of dot columns are divided into a predetermined number of groups, each of said plurality of groups defining a block having the plurality of dot rows.

3. The print data output circuit according to claim 2, wherein said counter unit includes:

a D counter for counting the number of said groups for each character;

an N counter for counting the total number of groups in a row;

an L counter for counting the number of the bit rows of each character;

an M counter for counting the total number of rows of the characters, wherein the first address of the data memory is generated in accordance with the counts of said N counter and M counter, and wherein the second address of the bitmap memory is generated in accordance with the counts of said N counter and L counter, and a character code read out of said data memory.

4. A method of printing characters arranged in a matrix of a plurality of character rows by a plurality of character columns, each character having a corresponding bitmap consisting of a matrix of a plurality of dots by a plurality of bit rows, the method comprising:

sequentially designating the rows of the character matrix and executing the following procedure for each designated character row;

sequentially designating the bit rows of a bitmap and executing the following procedure for each designated bit row; and sequentially designating the columns of the character matrix and executing (a)–(c) for each designated character column:

(a) designating a bitmap corresponding to a character at currently designated row and column;

(b) obtaining bitmap data for currently designated bit row; and (c) outputting the obtained bitmap data to the printer.

* * * * *